United States Patent
Merlin et al.

(10) Patent No.: US 10,142,972 B2
(45) Date of Patent: Nov. 27, 2018

(54) METHODS AND APPARATUS FOR MULTIPLE USER UPLINK RESPONSE RULES

(71) Applicant: QUALCOMM Incorporated, San Diego, CA (US)

(72) Inventors: Simone Merlin, San Diego, CA (US); Gwendolyn Denise Barriac, Encinitas, CA (US); George Cherian, San Diego, CA (US); Alfred Asterjadhi, San Diego, CA (US); Gang Ding, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 190 days.

(21) Appl. No.: 15/139,288

(22) Filed: Apr. 26, 2016

(65) Prior Publication Data
US 2016/0316474 A1   Oct. 27, 2016

Related U.S. Application Data

(60) Provisional application No. 62/153,381, filed on Apr. 27, 2015.

(51) Int. Cl.
*H04W 72/04*   (2009.01)
*H04W 74/08*   (2009.01)
*H04B 7/0452*   (2017.01)

(52) U.S. Cl.
CPC ....... *H04W 72/0413* (2013.01); *H04W 72/04* (2013.01); *H04W 74/0808* (2013.01); *H04B 7/0452* (2013.01)

(58) Field of Classification Search
CPC . H04W 72/00; H04W 84/12; H04W 74/0808; H04W 72/0413; H04W 16/14; H04W 72/04; H04W 74/0816; H04W 74/0825; H04L 5/0007; H04B 7/0452
See application file for complete search history.

(56) References Cited

U.S. PATENT DOCUMENTS

| | | | |
|---|---|---|---|
| 2011/0268094 A1* | 11/2011 | Gong | H04L 1/1685 370/338 |
| 2012/0082147 A1* | 4/2012 | Liu | H04L 5/001 370/338 |
| 2012/0207036 A1* | 8/2012 | Ong | H04W 74/0816 370/252 |

(Continued)

OTHER PUBLICATIONS

International Search Report and Written Opinion—PCT/US2016/029574—ISA/EPO—dated Jul. 13, 2016.

(Continued)

*Primary Examiner* — Kevin C. Harper
(74) *Attorney, Agent, or Firm* — Knobbe, Martens, Olson & Bear, LLP (57) ABSTRACT

Methods and apparatus for multiple user uplink are provided. In one aspect, method for wireless communication includes receiving a message comprising a request for two or more stations to concurrently transmit an uplink transmission. The method further includes determining a status of a medium at a station based on a clear channel assessment (CCA) or a network allocation vector (NAV). The method further includes selectively transmitting the uplink transmission based on the indication of the status of the medium.

22 Claims, 7 Drawing Sheets

(56) References Cited

U.S. PATENT DOCUMENTS

| | | | |
|---|---|---|---|
| 2014/0192820 A1* | 7/2014 | Azizi | C12N 15/74 |
| | | | 370/445 |
| 2014/0355534 A1 | 12/2014 | Vermani et al. | |
| 2015/0043482 A1 | 2/2015 | Choi et al. | |
| 2015/0063258 A1 | 3/2015 | Merlin et al. | |
| 2015/0071215 A1 | 3/2015 | Tian et al. | |
| 2017/0325253 A1* | 11/2017 | Wang | H04L 27/04 |
| 2018/0110057 A1* | 4/2018 | Park | H04W 72/12 |

OTHER PUBLICATIONS

Ahn W (Yonsei Univ): "UL-OFOMA Procedure in IEEE 802.11 ax, 11-15-0091-01-00ax-ul-ofdma-procedure-in-ieee-802-11ax," IEEE Draft, 11-15-0091-01-00AX-UL-OFOMA-Proceoure-INIEEE-802-11AX, IEEE-SA Mentor, Piscataway, NJ USA, vol. 802.11 ax, No. 1, Jan. 13, 2015 (Jan. 13, 2015), XP068082626, pp. 1-20, [retrieved on Jan. 13, 2015].
European Search Report—EP18178086—Search Authority—The Hague—dated Jul. 26, 2018.

* cited by examiner

METHODS AND APPARATUS FOR MULTIPLE USER UPLINK RESPONSE RULES

CROSS REFERENCE TO RELATED APPLICATIONS

This application claims priority benefit under 35 U.S.C. § 119(e) to U.S. Provisional Patent Application No. 62/153,381 entitled "METHODS AND APPARATUS FOR MULTIPLE USER UPLINK RESPONSE RULES" filed on Apr. 27, 2015, the disclosure of which is hereby incorporated by reference in its entirety.

BACKGROUND

Field

Certain aspects of the present disclosure generally relate to wireless communications, and more particularly, to methods and apparatus for response rules in multiple user uplink communications in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals (UTs) to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises receiving a message comprising a request for two or more stations to concurrently transmit an uplink transmission. The method further comprises determining a status of a medium at the station based on at least one of a clear channel assessment (CCA) and a network allocation vector (NAV). The method further comprises selectively transmitting the uplink transmission based on the status of the medium at the station or based on an indication included in the message.

Another aspect of the disclosure provides an apparatus for wireless communication. The apparatus comprising a receiver configured to receive a message comprising a request for two or more stations to concurrently transmit an uplink transmission. The apparatus further comprising a processor configured to determine a status of a medium based on at least one of a clear channel assessment (CCA) and a network allocation vector (NAV). The apparatus further comprising a transmitter configured to selectively transmit the uplink transmission based on the status of the medium or based on an indication included in the message.

Another aspect of the disclosure provides an apparatus for wireless communication. The apparatus comprising means for receiving a message comprising a request for two or more stations to concurrently transmit an uplink transmission. The apparatus further comprises means for determining a status of a medium based on at least one of a clear channel assessment (CCA) and a network allocation vector (NAV). The apparatus further comprises means for selectively transmitting the uplink transmission based on the status of the medium or based on an indication included in the message.

Another aspect of the disclosure provides a non-transitory computer readable medium. The medium comprising instructions that when executed cause a processor to perform a method of receiving a message comprising a request for two or more stations to concurrently transmit an uplink transmission. The medium further comprising instructions that when executed cause a processor to perform a method of determining a status of a medium at the station based on at least one of a clear channel assessment (CCA) and a network allocation vector (NAV). The medium further comprising instructions that when executed cause a processor to perform a method of selectively transmitting the uplink transmission based on the status of the medium or based on an indication included in the message.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof Wireless network technologies may include various types of wireless local area networks (WLANs). A WLAN may be used to interconnect nearby devices together, employing various networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may be used to transmit wireless signals across short distances, may be able to transmit signals less likely to be blocked by objects, such as humans, may allow for increased peer-to-peer services (e.g., Miracast, WiFi Direct Services, Social WiFi, etc.) in the same area, may support increased per-user minimum throughput requirements, supporting more users, may provide improved outdoor coverage and robustness, and/or may consume less power than devices implementing other wireless protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol such as 802.11ah) compliant wireless link to obtain general connectivity to the Internet or to other wide area networks. In some implementations, a STA may also be used as an AP.

The techniques described herein may be used for various broadband wireless communication systems, including communication systems that are based on an orthogonal multiplexing scheme. Examples of such communication systems include Spatial Division Multiple Access (SDMA) systems, Time Division Multiple Access (TDMA) systems, Orthogonal Frequency Division Multiple Access (OFDMA) systems, Single-Carrier Frequency Division Multiple Access (SC-FDMA) systems, and so forth. An SDMA system may utilize different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM (Global System for Mobile) or some other standards known in the art. An OFDMA system may utilize orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, may utilize localized FDMA (LFDMA) to transmit on a block of adjacent sub-carriers, or may utilize enhanced FDMA (EFDMA) to transmit on multiple blocks of adjacent sub-carriers. In general, modulation symbols are sent in the frequency domain with OFDM and in the time domain with SC-FDMA. An SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In certain implementations, an ESS is a set of AP's.

A station "STA" may also comprise, be implemented as, or known as a user terminal ("UT"), an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium or channel.

Figure 1:
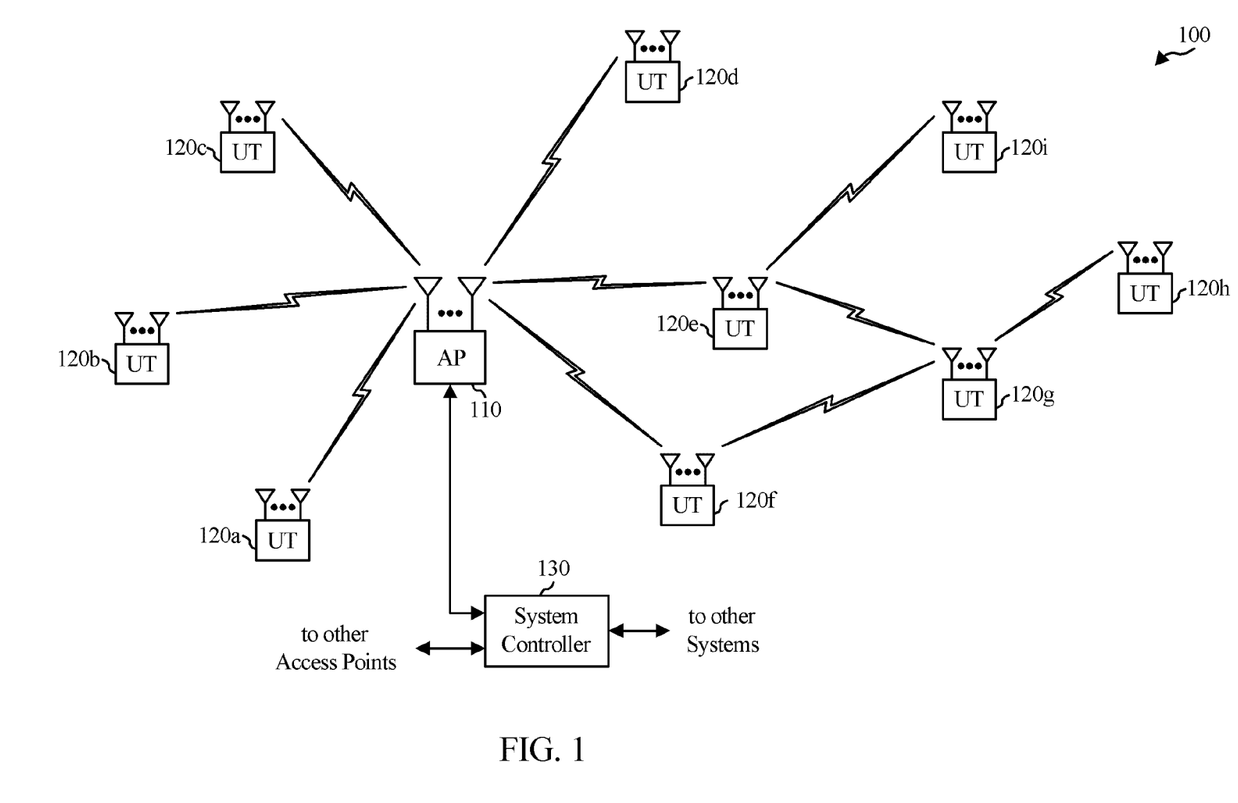
FIG. 1 illustrates a multiple-access multiple-input multiple-output (MIMO) system with access points and user terminals.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals (UTs) 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
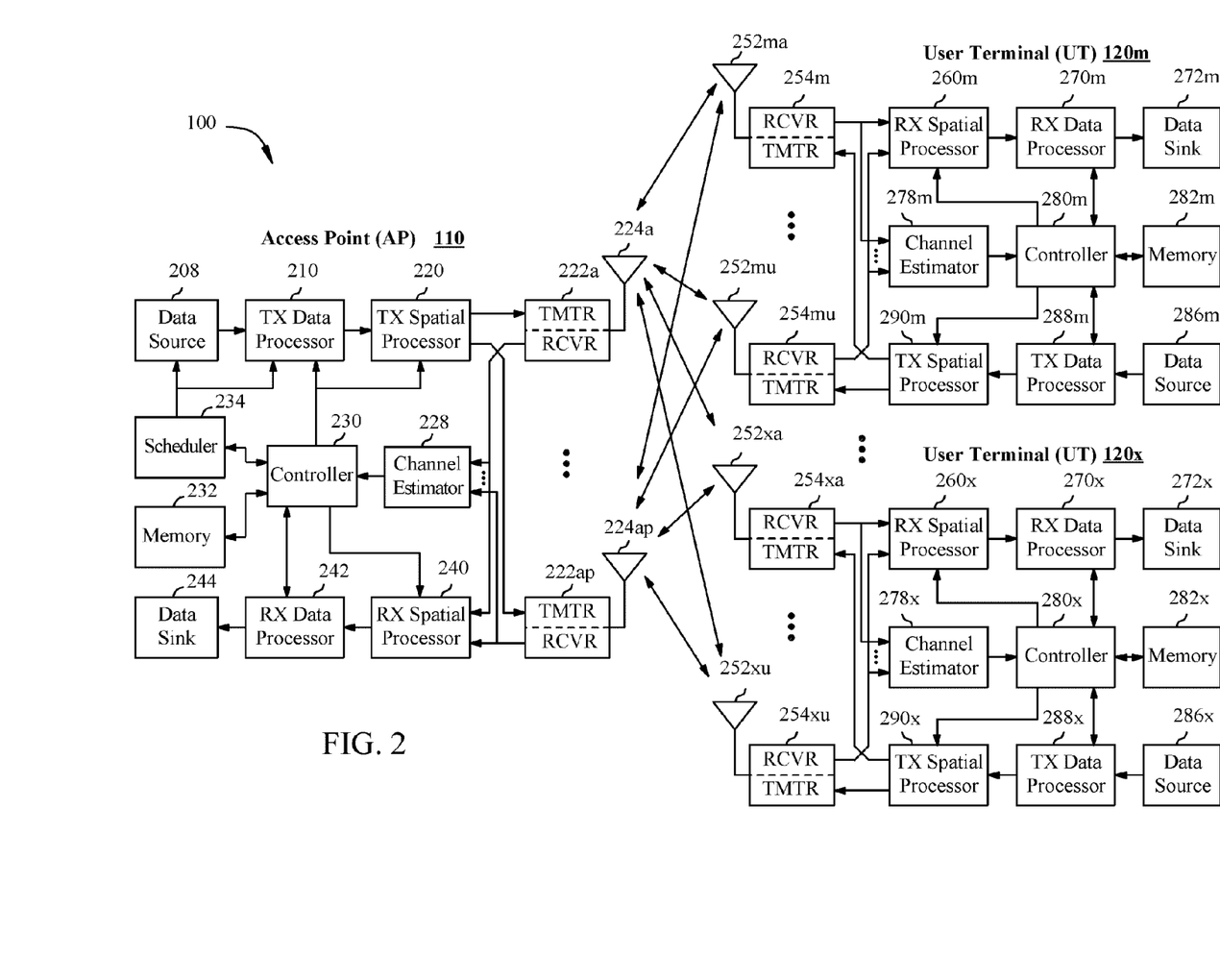
FIG. 2 illustrates a block diagram of the access point 110 and two user terminals 120$m$ and 120$x$ in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. Memory 282, which may include both read-only memory (ROM) and random access memory (RAM), provides instructions and data to the controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. Memory 232, which may include both read-only memory (ROM) and random access memory (RAM), provides instructions and data to the controller 230.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal. The decoded data may be provided to a data sink 272 for storage and/or a controller 280 for further processing.

At each user terminal 120, a channel estimator 278 estimates the downlink channel response and provides downlink channel estimates, which may include channel gain estimates, signal-to-noise ratio (SNR) estimates, noise variance and so on. Similarly, a channel estimator 228 at AP 110 estimates the uplink channel response and provides uplink channel estimates similar to the estimates for the downlink. Controller 280 for each user terminal 120 may derive the spatial filter matrix for the user terminal based on the downlink channel response matrix $H_{dn,m}$ for that user terminal. Similarly, controller 230 derives the spatial filter matrix for the access point 110 based on the effective uplink channel response matrix $H_{up,eff}$. The controller 280 for each user terminal 120 may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
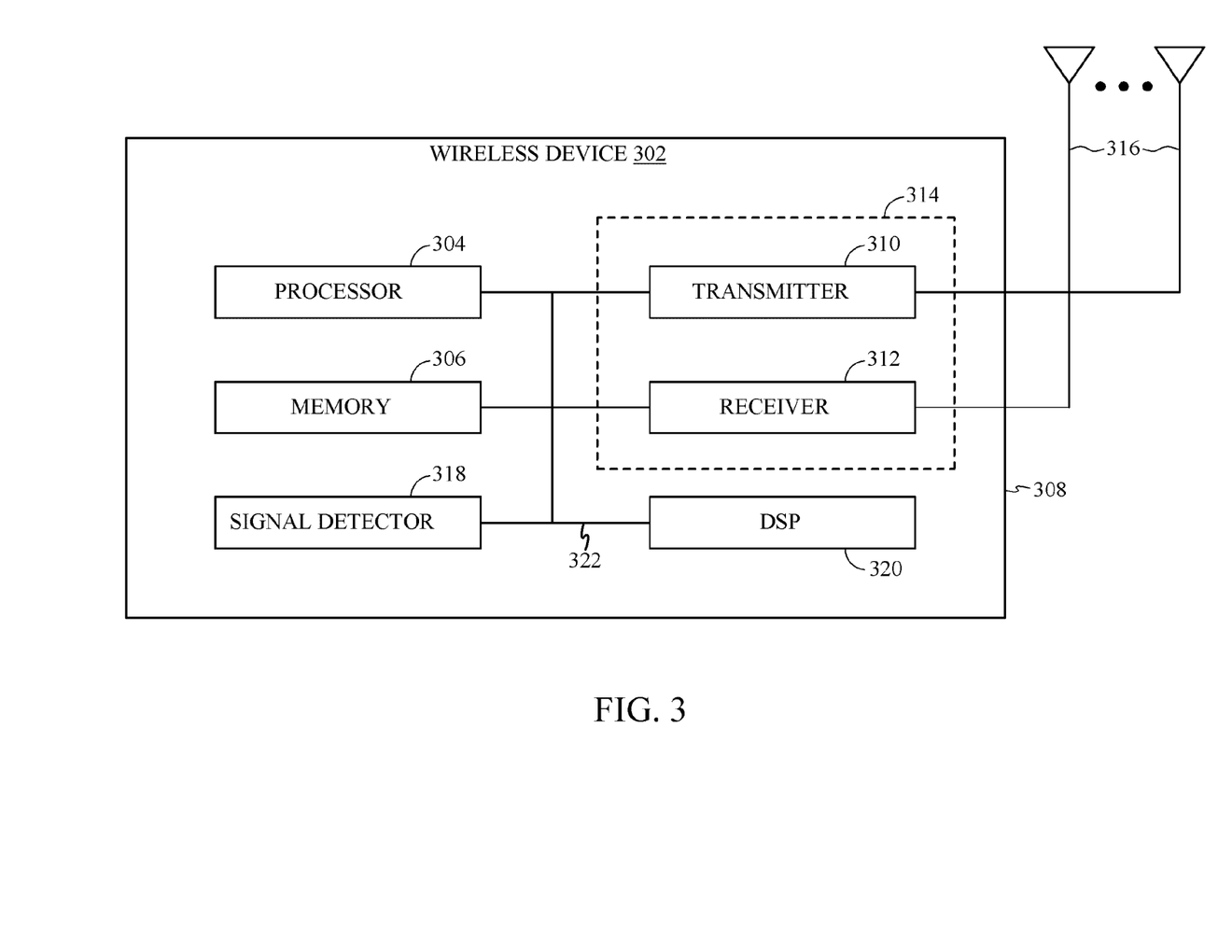
FIG. 3 illustrates various components that may be utilized in a wireless device that may be employed within a wireless communication system.

FIG. 3 illustrates various components that may be utilized in a wireless device 302 that may be employed within the MIMO system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and another device. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
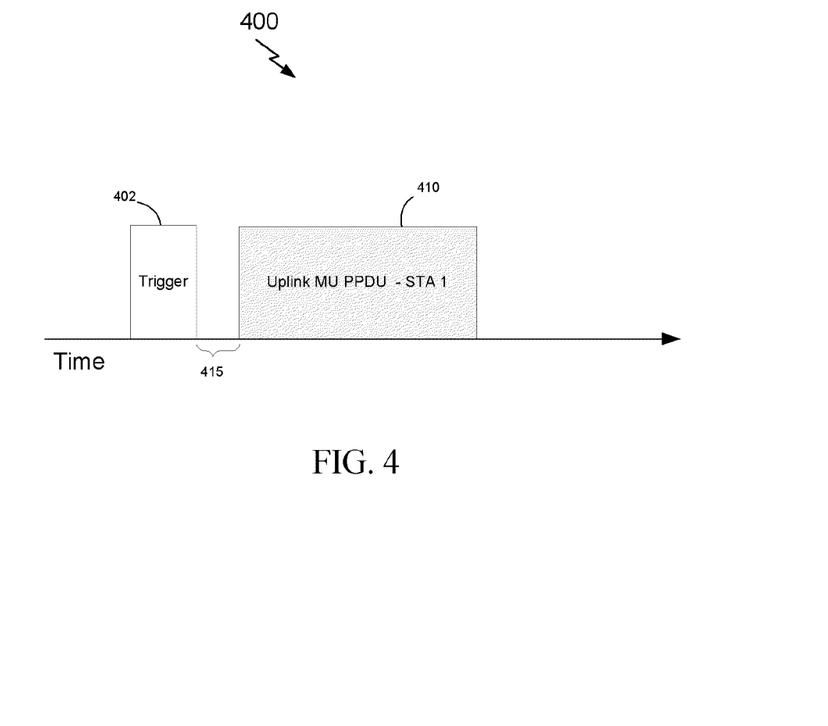
FIG. 4 shows a time diagram of an example frame exchange of an uplink (UL) multiple-user (MU) communication.
Figure 5:
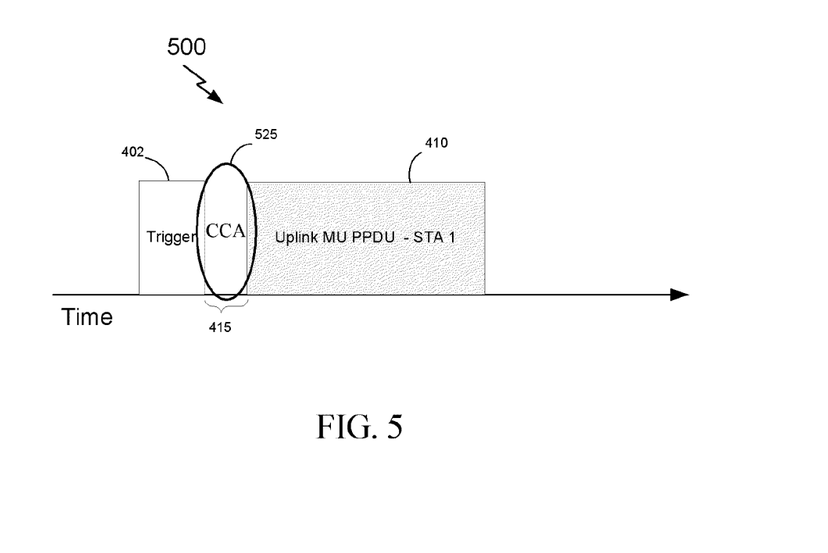
FIG. 5 shows a time diagram of another example frame exchange of an UL-MU communication.
Figure 6:
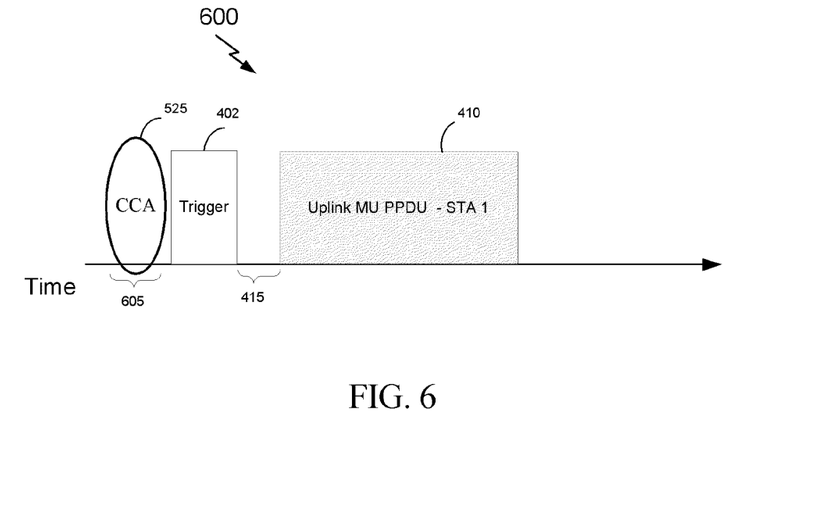
FIG. 6 shows a time diagram of an example frame exchange of an UL-MU communication.

Certain aspects of the present disclosure support transmitting an uplink (UL) signal from multiple STAs to an AP or other device. In some embodiments, the UL signal may be transmitted in a multi-user MIMO (MU-MIMO) system. Alternatively, the UL signal may be transmitted in a multicarrier FDMA (MC-FDMA) or similar FDMA system. Specifically, FIGS. 4-6, illustrate an UL-MU PPDU packet 410 transmitted from a STA to an AP with other STAs concurrently sending their own-UL-MU-MIMO or UL-FDMA transmissions. In some embodiments, a trigger message may be sent with channel access rules, including the dynamic selection of available bandwidth (BW) depending on a check of the clear channel assessment (CCA) on a secondary channel at the AP. The AP may define transmission channels and streams per each STA for the UL transmissions. UL-MU-MIMO or UL-FDMA transmissions sent simultaneously from multiple STAs to an AP may create efficiencies in wireless communication.

In some embodiments, the two or more STAs may transmit their UL-MU-MIMO or UL-FDMA transmissions regardless of whether at least a portion of the bandwidth of the channel is available, or regardless of whether a clear channel assessment (CCA) of the STAs indicates that the channel or medium is busy, in response to receiving a frame from the AP 110. In some aspects, the AP 110 may set a flag or may set a field in the frame to a certain value to indicate that the two or more STAs should transmit their UL-MU-MIMO or UL-FDMA transmissions regardless of whether at least a portion of the bandwidth of the channel is available or regardless of the CCA of the STA in response to receiving the frame from the AP 110. In some aspects, the two or more STAs may be pre-configured to transmit their UL-MU-MIMO or UL-FDMA transmissions regardless of whether at least a portion of the bandwidth of the channel is available, or regardless of whether the CCA of the STAs indicates that the channel or medium is busy, in response to receiving the frame from the AP 110. Such uplink transmissions may fail if the bandwidth of the channel, or a portion of the bandwidth of the channel, is busy.

STAs may also check a network allocation vector (NAV) before transmitting an uplink communication. A CCA/NAV check maybe useful to avoid transmitting on a busy medium which may result in corrupted reception. The CCA/NAV check may also aid in limiting interference to/from neighboring STAs or other devices. For example, UL-MU transmissions from multiple STAs may result in increased aggregated power from the multiple transmissions and therefore may cause increased interference energy levels.

Accordingly, it may be beneficial for a STA to determine the status of the channel or medium using a CCA and/or NAV check prior to transmitting an UL-MU-MIMO, UL-FDMA transmission or other UL transmission. Checking the NAV may comprise reading a value in a media access control (MAC) header portion of a message that reserves the medium for a period of time. Checking the CCA may comprise checking a physical state or energy level on a channel or medium. In some embodiments, the CCA may be checked using a mid-packet detection method. The mid-packet detection of the CCA can be based on detecting packets already on the medium and based further on either energy detection (e.g., detecting that the energy on the medium satisfies a threshold) or based on guard interval (GI) detection (e.g., detecting whether the GI is idle) of those packets. In some embodiment, energy or GI on the medium is continuously monitored for mid-packet detection.

In some embodiments, the CCA may be checked using a preamble detection method. In the preamble detection method, a preamble of a message may include an indication of the duration of the packet being transmitted. A device reading the preamble may then determine for that duration the medium is considered busy. In some aspects, a device may read and disregard certain preambles and the medium may not be considered busy by the device (e.g., preambles sent by a neighboring BSS, or preambles that meet certain criteria such as a received power limit or type of PHY mode.)

In some embodiments, an AP 110 may transmit a message including a request that the STAs transmit UL-FDMA or UL-MU-MIMO transmissions. FIG. 4 is a time sequence diagram illustrating an example of an UL-MU/MC protocol 400 that may be used for UL communications, including but not limited to UL-FDMA or UL-MU-MIMO transmissions. As shown in FIG. 4, and in conjunction with FIG. 1, an AP 110 may transmit a trigger message 402 to two or more STAs (e.g., UT 120s) indicating that they may participate in an UL-FDMA or UL-MU-MIMO scheme. After receiving the trigger message 402 and after an interframe space (IFS) time 415, STA 1 of the two or more STAs concurrently transmits an UL-MU PPDU packet 410 with UL-MU PPDU packets of the other STAs. As stated above, the STA 1 may transmit the UL-MU PPDU packet 410 using an UL-FDMA or UL-MU-MIMO scheme.

In some embodiments, the STAs may check the CCA during the interframe space (IFS) time 415 after the STAs receive the trigger message 402 and before the STAs send the UL-MU PPDU packet 410. FIG. 5 is a time sequence diagram illustrating an example of an uplink multiple-user/multiple carrier (UL-MU/MC) protocol 500 that may be used for UL communications. The UL-MU/MC protocol 500 illustrated in FIG. 5 is similar to and adapted from the UL-MU/MC protocol 400 illustrated in FIG. 4. Elements common to both share common reference indicia, and only differences between the protocols 400 and 500 are described herein for the sake of brevity.

As shown in FIG. 5, the STA 1 performs a CCA check 525 during the IFS time 415. In some aspects, the IFS time 415 may comprise a short interframe space (SIFS) or a point coordination function (PCF) interframe space (PIFS) time. In some aspects, the IFS time 415 may comprise a 20 microsecond (μs) time period called a TIFS (or interframe space time). In some embodiments, the CCA check can be a background measurement process and can be sampled immediately before initiating the response UL-MU PPDU packet 410. In some embodiments, the CCA check 525 may be performed on each 20 MHz channel (or smaller or larger channel) of a bandwidth independently or may be performed across the entire bandwidth. As stated above, the CCA check 525 may use energy or GI detection methods.

In some embodiments, the STAs may check the CCA before the STAs receive the trigger message 402 and before the STAs send the UL-MU PPDU packet 410. FIG. 6 is a time sequence diagram illustrating an example of an UL-MU/MC protocol 600 that may be used for UL communications. The UL-MU/MC protocol 600 illustrated in FIG. 6 is similar to and adapted from the UL-MU/MC protocol 500 illustrated in FIG. 5. Elements common to both share common reference indicia, and only differences between the protocols 500 and 600 are described herein for the sake of brevity.

As shown in FIG. 6, the STA 1 performs a CCA check 525 prior to receiving the trigger message 402. The STA 1 may continuously monitor the energy level (or GI) of the channel and may store the measurement of the energy level (or GI). When STA 1 receives the trigger message 402, STA 1 looks back at the measurement or status of the CCA check 525 for a time period 605 before the reception of the trigger message 402. In some embodiments, the time period 605 may comprise a SIFS, PIFS, or TIFS time period between the end of a preceding frame on the medium and the trigger message 402. In some aspects, the time period may comprise a longer or shorter time period before the trigger message 402. Based on the CCA check 525 during the time period 605 before the reception of the trigger message 402, the STA 1 may determine whether to send its UL-MU PPDU packet 410 or not.

In some embodiments, after performing the CCA check 525, the STA 1 may determine whether to send its UL-MU PPDU packet 410 or to refrain from sending it. In an UL-MU-MIMO scheme, the STA 1 may receive the trigger message 402 on an 80 MHz or other sized bandwidth (e.g., 20 or 40 MHz). The trigger message 402 may indicate that the STAs transmitting an UL-MU-MIMO PPDU should transmit over the entire 80 MHz bandwidth. In some aspects, the STA 1 performs the CCA check 525 on the entire 80 MHz bandwidth or on each of a smaller segment of the bandwidth. For example, the STA may check each 20 MHz or 40 MHz channel of the 80 MHz bandwidth. Regardless of how the STA 1 checks the CCA on the 80 MHz bandwidth, in some embodiments, STA 1 only transmits the UL-MU PPDU packet 410 if the entire 80 MHz bandwidth is idle.

In an UL-FDMA or UL-OFDMA scheme, the STA 1 may receive the trigger message 402 over the entire 80 MHz (or other sized) bandwidth. In some embodiments, the AP 110 may allocate a portion of the 80 MHz bandwidth to STA 1 for its uplink transmission. For example, the trigger message 402 may include an indication that STA 1 is allocated 5 MHz of the 80 MHz bandwidth for its uplink transmission. In some aspects, STA 1 may perform the CCA check 525 over the entire 80 MHz bandwidth and only transmit its UL-OFDMA PPDU if the entire 80 MHz bandwidth is idle. In other aspects, STA 1 may be allocated 5 MHz to transmit its UL-OFDMA PPDU. STA 1 may perform the CCA check 525 over one or more 20 MHz channels of the bandwidth and only transmit its UL-OFDMA PPDU if the entire 20 MHz channel containing its allocated 5 MHz bandwidth is idle.

In some embodiments, the AP 110 may allocate certain bandwidths and/or spatial streams to each STA. In some aspects, some STAs may not be able to use the entire bandwidth or streams because other STAs are using a portion of the assigned bandwidth or streams. In some embodiments, STAs may perform the CCA check 525 across the entire bandwidth or across each channel of the bandwidth to determine if a portion of the allocated bandwidth is available for transmission. The STAs may then choose to transmit their UL-MU PPDU over the portion of the allocated bandwidth that is idle (i.e., available for transmission). For example, in FIG. 5, STA 1 may receive trigger message 402 that allocates STA 1 80 MHz for its UL-MU PPDU packet 410. The STA 1 may then perform CCA check 525 and determine that only the top 40 MHz of the 80 MHz bandwidth is available for transmission and the bottom 40 MHz is busy. In some embodiments, STA 1 may transmit its UL-MU PPDU packet 410 over the top 40 MHz and refrain from transmitting over the bottom 40 MHz of the 80 MHz bandwidth. In one aspect, the transmission bandwidth must include the primary channel.

In some embodiments, the AP 110 may assign pre-designated channels for each STA depending on the allocated bandwidth for each STA. The pre-designated channel may also be defined by the AP and/or STA and may comprise one or more of the basic channels. For example, a STA may be assigned 40 MHz with two 20 MHz basic channels. The STA and the AP may agree that the STA should transmit on the bottom 20 MHz (i.e., pre-designated channel) when a portion of the full 40 MHz is unavailable. In some embodiments, the pre-designated channel allows the AP to more quickly search for the UL transmission from the STA because the AP only needs to search on the full allocated bandwidth or the pre-designated channel for the transmission. Each pre-designated channel can be contained within the STAs allocated channels. In this aspect, if a STA sees its pre-designated channel is busy, then the STA may not send an UL transmission. In other embodiments, an AP 110 may define more than one pre-designated channel for a STA and such pre-designated channel may comprise a channel less than 20 MHz. For example, an AP 110 could define a pre-designated channel of 20 MHz, and a pre-designated channel of 5 MHz. If the 20 MHz pre-designated channel is not available, but the 5 MHz pre-designated channel is, the STA could use the 5 MHz pre-designated channel. In another embodiment, the AP 110 may not define a pre-designated channel and a STA may transmit on any of its respective available bandwidth.

STA 1 may also determine whether to transmit its UL-MU PPDU packet 410 based on the NAV. STA 1 may set its NAV based on any received packet that includes a duration field in the MAC header. For UL-MU-MIMO transmissions, STA 1 may check the NAV based on packets decoded on a pre-designated channel (i.e., primary channel) and not on packets decoded on other basic channels (i.e., secondary channels). For UL-OFDMA transmissions, in some aspects, STA 1 may check the NAV based on packets decoded on a pre-designated channel (i.e., primary channel). In other aspects, the AP 110 may assign another basic channel (i.e., a secondary channel) for UL-OFDMA transmission. In this aspect, STA 1 may check the NAV based on packets decoded on the assigned basic channel (i.e., secondary channel) instead of, or in addition to, the pre-designated channel (i.e., primary channel).

In some embodiments, STA 1 may check the NAV at the time it receives the trigger message 402. In response to receiving the trigger message 402 and checking the NAV, in some aspects, STA 1 may choose to disregard any NAV constraint and transmit its UL-MU PPDU packet 410 based solely on the CCA check 525 (if performed). In other aspects, STA 1 may honor the NAV and decide not to transmit if the NAV is set in any of the channels where the UL-MU PPDU packet 410 transmission would span. For example, UL-MU-MIMO transmissions would likely span the pre-designated channel (i.e., primary channel) and if the NAV was set on the pre-designated channel, then STA 1 would not transmit the UL-MU PPDU packet 410. Similarly for UL-OFDMA transmissions, the UL transmission may span the pre-designated channel (i.e., primary channel) or an assigned basic channel (i.e., secondary channel) as discussed above. If the NAV was set on the pre-designated channel (i.e., primary channel) or the assigned basic channel, then STA 1 may not transmit the UL-MU PPDU packet 410.

In some embodiments, the UL-MU PPDU packet 410 may comprise a mixed UL-MU-MIMO/UL-OFDMA transmission. In some aspects, the UL-MU-MIMO transmission may occur within one of the UL-OFDMA basic channels (i.e., subchannels). In such a case, the mixed UL-MU-MIMO/UL-OFDMA transmission follows the UL-OFDMA rules described above.

In some embodiments, STA 1 may perform the CCA check 525 and/or the NAV check based on certain criteria.

In some aspects, STA 1 may perform the CCA check 525 and/or the NAV check based on the duration of the UL-MU PPDU packet 410. For example, STA 1 may only perform the CCA check 525 and/or the NAV check if the UL-MU PPDU packet 410 duration exceeds a certain threshold.

In some aspects, STA 1 may transmit its UL-MU PPDU packet 410 based on specific transmission parameters that are set for each STA. For example, STA 1 may transmit its UL-MU PPDU packet 410 based on one or more of the GI, bandwidth, transmission (TX) power, modulation and coding scheme (MCS), TX time, identity of other STAs, amount of data to be transmitted, and estimated duration of the data excluding padding. STA 1 may use the transmission parameter requirements in addition to the CCA check 525 or NAV check in order to determine whether to transmit the UL-MU PPDU packet 410 to the AP 110.

In some embodiments, the requirements and thresholds for the CCA check 525 and/or the NAV check described above, or for any other parameter used by STA 1 for the determination of whether to transmit the UL-MU PPDU packet 410 may be determined by the AP 110 and indicated in one or more of the trigger message 402, a beacon frame, and a management frame (e.g., an association response). In some aspects, the requirements and thresholds for the CCA check 525 and/or the NAV check, or for any other parameter used by STA 1 for the determination of whether to transmit the UL-MU PPDU packet 410, may be pre-determined in an 802.11 protocol. Allowing the AP 110 to determine the requirements and thresholds may be beneficial because APs in a given network may be able to coordinate and optimize the operation of the network across overlapping basic service sets (OBSS). Such coordination may allow the APs to select an appropriate CCA threshold for the STAs and include the selected threshold or other parameters in the trigger message 402 or other messages. In some aspects, the AP 110 may use a sensitive CCA to send the trigger message 402 so that there is a high probability the medium is idle around the receiver (e.g., STA 1). In such an embodiment, the AP 110 may exempt the STAs from checking the CCA/NAV.

Figure 7:
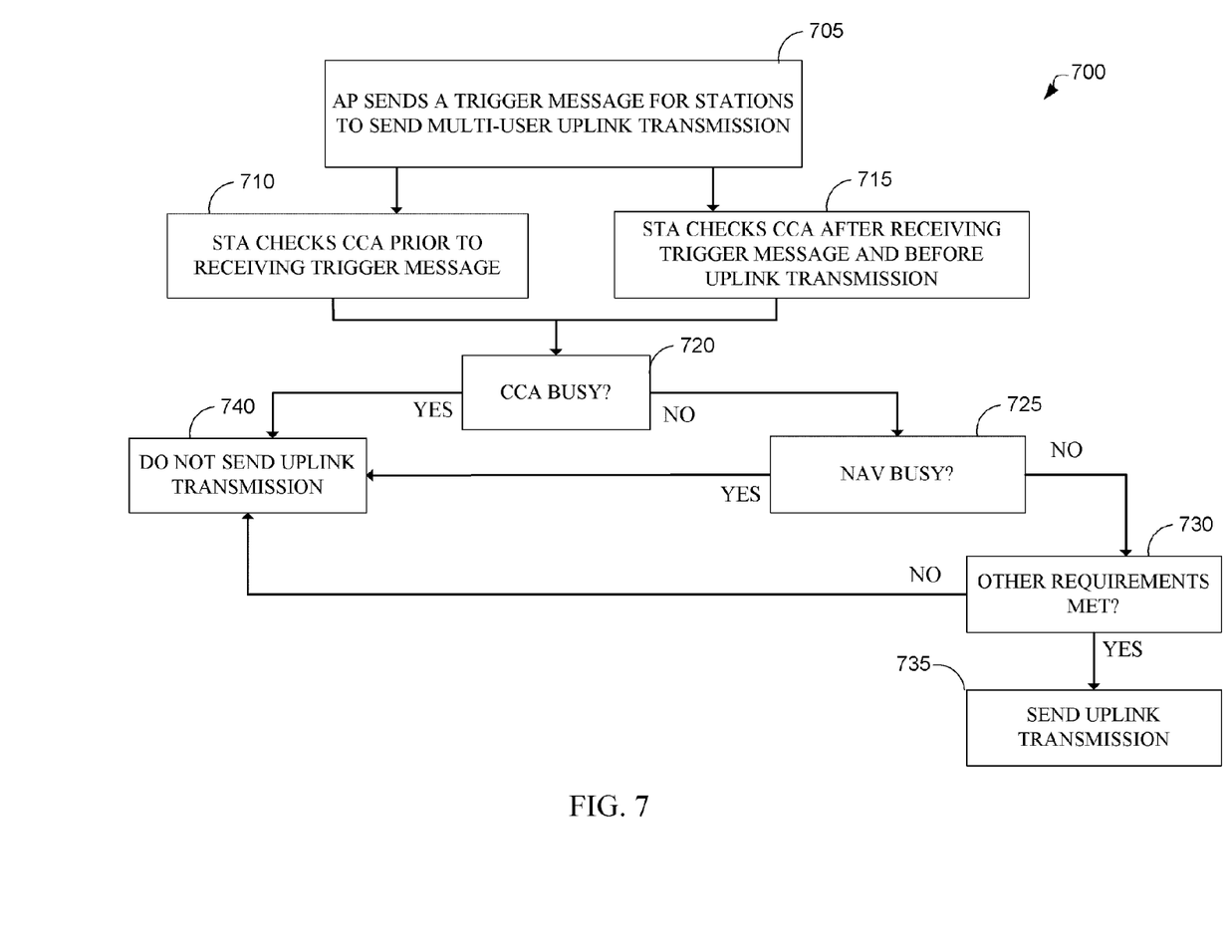
FIG. 7 is a flow chart of an aspect of an exemplary method for providing wireless communication.

FIG. 7 is a flow chart of an exemplary method 700 for wireless communication in accordance with certain embodiments described herein. As described in method 700, an AP (e.g., AP 110) transmits a message to two or more STAs or user terminals 120, however, in other embodiments, the communications described in method 700 may occur between two or more AP 110, two or more STAs or any combination of AP 110s and STAs (or user terminals 120).

In operation block 705, the AP 110 sends a trigger message (e.g., trigger message 402) to two or more stations for the two or more stations to send an uplink transmission. In some embodiments, the trigger message may comprise a clear to transmit (CTX) message. In some embodiments, at block 710, a station (e.g., STA 1) receiving the trigger message 402 may perform a CCA check (e.g., CCA check 525) prior to receiving the trigger message 402. STA 1 may continuously monitor the energy level (or GI) of the medium and may store the measurement of the energy level. When STA 1 receives the trigger message 402, STA 1 looks back at the measurement or status of the CCA check 525 for a time period before the reception of the trigger message 402 to determine if the medium is busy. In some embodiments, at block 715, STA 1 performs the CCA check 525 after receiving the trigger message 402 and before sending the uplink transmission (e.g., UL-MU PPDU packet 410). In some embodiments, STA 1 may perform the CCA check 525 only if the UL-MU PPDU packet 410 duration satisfies a certain threshold. After the STA 1 performs the CCA check 525, at block 720, STA determines whether the CCA check 525 indicates that the medium is busy or idle. In some embodiments, STA 1 may check the CCA across the entire bandwidth or on each channel of the bandwidth. If STA 1 determines that CCA indicates that the medium is busy, then at block 740, STA 1 does not send the UL-MU PPDU packet 410. In some embodiments, STA 1 may only refrain from sending the UL-MU PPDU packet 410 on the portion of the bandwidth that is busy and may transmit the UL-MU PPDU packet 410 on the portion of the bandwidth that is available or idle.

If the CCA check 525 indicates that the medium is not busy, then at block 725, STA 1 may check the NAV to determine if the medium is busy. In some embodiments, the CCA check 525 and the NAV check are performed in parallel. In some embodiments, STA 1 checks the NAV only on a pre-designated channel (i.e., primary channel) or on an assigned channel other than the primary channel (i.e., secondary channel). If the NAV check indicates that the medium is busy (i.e., the NAV is set), then at block 740, STA 1 does not send the UL-MU PPDU packet 410. If the NAV check indicates that the medium is not busy, then at block 730, STA 1 checks to see if any other transmission requirements are met. In some embodiments, STA 1 may disregard any NAV constraint and may proceed to block 730 regardless of the NAV check at block 725. In some embodiments, the transmission requirements may be based on whether one or more of the GI, bandwidth, transmission (TX) power, modulation and coding scheme (MCS), TX time, identity of other STAs, amount of data to be transmitted, and estimated duration of the data excluding padding satisfy a certain threshold. If the transmission parameter requirements are not satisfied, then at block 740, STA 1 does not send the UL-MU PPDU packet 410. If the transmission parameter requirements are satisfied or if there are no requirements, then at block 735, STA 1 sends the UL-MU PPDU packet 410.

Figure 8:
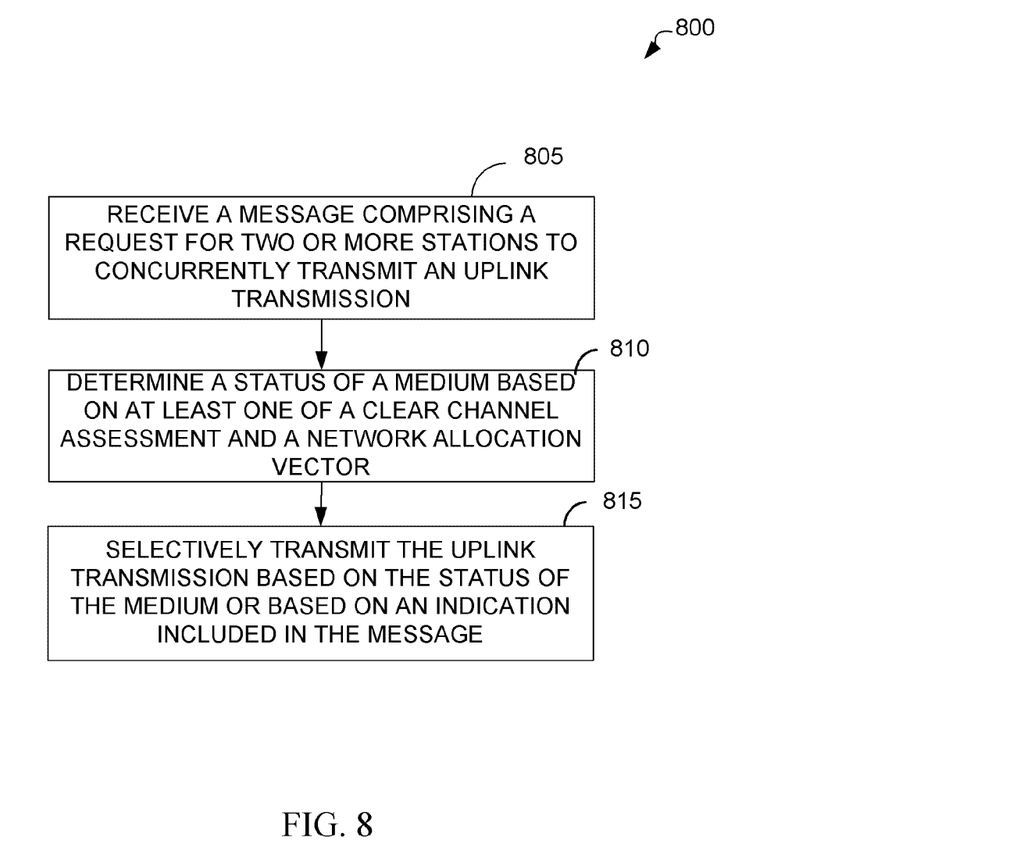
FIG. 8 is a flow chart of an aspect of an exemplary method for providing wireless communication.

FIG. 8 is a flow chart of an exemplary method 800 for wireless communication in accordance with certain embodiments described herein. The method 800 may be used to generate and transmit any of the messages described above. The messages may be transmitted by one or more of the user terminals 120 to the AP 110 as shown in FIG. 1. In addition, the wireless device 302 shown in FIG. 3 may represent a more detailed view of the AP 110, the user terminals 120, or the STAs 1 and 2, as described above. Thus, in one implementation, one or more of the steps in flowchart 800 may be performed by, or in connection with, a processor and/or transmitter, such as the processor 304 and transmitter 310 of FIG. 3, although those having ordinary skill in the art will appreciate that other components may be used to implement one or more of the steps described herein.

In operation block 805, a user terminal 120 may receive a message comprising a request for two or more stations to concurrently transmit an uplink transmission. In operational block 810, the user terminal 120 may determine a status of a medium based on at least one of a clear channel assessment (CCA) and a network allocation vector (NAV). In some embodiments, the user terminal 120 may perform a CCA check or a NAV check to determine the status of the medium. In operational block 815, the user terminal 120 may selectively transmit the uplink transmission based on the indication of the status of the medium or based on an indication included in the message.

In some embodiments, an apparatus for wireless communication may perform one or more of the functions of the method 800. In some embodiments, the apparatus may comprise means for receiving a message comprising a request for two or more stations to concurrently transmit an uplink transmission. The apparatus may further comprise means for determining a status of a medium based on a clear channel assessment (CCA) or a network allocation vector (NAV). The apparatus may further comprise means for selectively transmitting the uplink transmission based on the indication of the status of the medium. In some embodiments, the means for receiving may comprise the receiver 312 of FIG. 3. In some embodiments, the means for checking may comprise the processor 304 or the DSP 320. In some embodiments, the means for selectively transmitting may comprise the transmitter 310.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
   receiving, by a first station, a message comprising a request for two or more stations to concurrently transmit an uplink transmission, the two or more stations including the first station;
   determining, by the first station, a status of a medium at the first station based on at least one of a clear channel assessment (CCA) or a network allocation vector (NAV); and
   selectively transmitting the uplink transmission based on the determined status of the medium at the station or based on an indication included in the message,
   wherein selectively transmitting comprises transmitting the uplink transmission based on a transmission parameter, and wherein the transmission parameter comprises at least one member of the group consisting of a guard interval, a bandwidth, a transmission (TX) power, a modulation and coding scheme (MCS), a TX time, an identity of other stations, an amount of data to be transmitted, and an estimated duration of the data excluding padding.

2. An apparatus for wireless communication comprising:
   a receiver configured to receive a message comprising a request for two or more stations to concurrently transmit an uplink transmission, a first station of the two or more stations including the apparatus;
   a processor configured to determine a status of a medium based on at least one of a clear channel assessment (CCA) or a network allocation vector (NAV); and
   a transmitter configured to selectively transmit the uplink transmission based on the determined status of the medium or based on an indication included in the message,
   wherein to selectively transmit the uplink transmission, the transmitter is configured to transmit the uplink transmission based on a transmission parameter, and wherein the transmission parameter comprises at least one member of the group consisting of a guard interval, a bandwidth, a transmission (TX) power, a modulation and coding scheme (MCS), a TX time, an identity of other stations, an amount of data to be transmitted, and an estimated duration of the data excluding padding.

3. The method of claim 1, wherein the performance of the CCA comprises checking the CCA on at least one pre-designated channel.

4. The method of claim 3, wherein the message comprises an indication of the at least one pre-designated channel.

5. The method of claim 1, wherein the performance of the CCA occurs during a short interframe space (SIFS) time, a point coordination function interframe space (PIFS) time, or an interframe space (TIFS) time between the reception of the message and the selective transmission of the uplink transmission.

6. The method of claim 1, wherein the determination of the status of the medium is based further on the duration of the uplink transmission.

7. The method of claim 1, wherein the determination of the status of the medium comprises detecting whether the medium is idle in a guard interval of an orthogonal frequency division multiplexing (OFDM) transmission.

8. The method of claim 1, further comprising setting the NAV based on messages received on the medium, the messages comprising the message.

9. The method of claim 1, wherein the message further includes an instruction for the two or more stations to transmit the uplink transmission using an uplink multiple user multiple-input multiple-output (MU-MIMO) transmission or an uplink multiple user orthogonal frequency division multiple access (MU-OFDMA) transmission.

10. The method of claim 1, wherein the message further includes an assignment of a frequency bandwidth for the uplink transmission.

11. The method of claim 10, wherein selectively transmitting comprises transmitting the uplink transmission on an available portion of the assigned bandwidth or on a subset of the available portion of the assigned bandwidth.

12. The method of claim 10, wherein selectively transmitting comprises refraining from transmitting the uplink transmission when the status of the medium is busy on at least a portion of the assigned bandwidth.

13. The method of claim 1, wherein selectively transmitting comprises refraining from transmitting the uplink transmission when the status of the medium is busy.

14. The method of claim 1, wherein the indication comprises a value in a field of the message indicating that the two or more stations should transmit the uplink transmission regardless of the status of the medium.

15. The apparatus of claim 2, wherein the performance of the CCA occurs during a short interframe space (SIFS) time, a point coordination function interframe space (PIFS) time, or an interframe space (TIFS) time between the reception of the message and the selective transmission of the uplink transmission.

16. The apparatus of claim 2, wherein the processor is further configured to determine the status of the medium based on the duration of the uplink transmission.

17. The apparatus of claim 2, wherein the processor is further configured to detect whether the medium is idle in a guard interval of an orthogonal frequency division multiplexing (OFDM) transmission.

18. The apparatus of claim 2, wherein the processor is further configured to set the NAV based on messages received on the medium, the messages comprising the message.

19. The apparatus of claim 2, wherein the message further includes an instruction for the two or more stations to transmit the uplink transmission using an uplink multiple user multiple-input multiple-output (MU-MIMO) transmission or an uplink multiple user orthogonal frequency division multiple access (MU-OFDMA) transmission.

20. The apparatus of claim 2, wherein the message further includes an assignment of a frequency bandwidth for the uplink transmission.

21. The apparatus of claim 20, wherein the transmitter is further configured to transmit the uplink transmission on an available portion of the assigned bandwidth or on a subset of the available portion of the assigned bandwidth.

22. The apparatus of claim 2, wherein the transmitter is further configured to refrain from transmitting the uplink transmission when the status of the medium is busy.

* * * * *